(12) United States Patent
Oberpriller

(10) Patent No.: US 10,463,140 B2
(45) Date of Patent: Nov. 5, 2019

(54) ATTACHMENT APPARATUS FOR ELECTRONIC DEVICE

(71) Applicant: Hand Held Products, Inc., Fort Mill, SC (US)

(72) Inventor: Mark Lee Oberpriller, Altanta, GA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/581,781

(22) Filed: Apr. 28, 2017

(65) Prior Publication Data

US 2018/0310699 A1    Nov. 1, 2018

(51) Int. Cl.
*A45F 5/00* (2006.01)
*G06K 7/10* (2006.01)

(52) U.S. Cl.
CPC .......... *A45F 5/00* (2013.01); *A45F 2005/008* (2013.01); *A45F 2200/0525* (2013.01); *A45F 2200/0533* (2013.01); *G06K 7/10891* (2013.01)

(58) Field of Classification Search
CPC . A45F 5/00; A45F 200/0516; A45F 2005/008
USPC ........................................................ 224/217
See application file for complete search history.

(56) References Cited

U.S. PATENT DOCUMENTS

| | | | | |
|---|---|---|---|---|
| 892,812 A | * | 7/1908 | Day | A24F 13/22 |
| | | | | 131/258 |
| 2,539,940 A | * | 1/1951 | Abramson | A47G 19/2205 |
| | | | | 224/217 |
| 3,993,230 A | * | 11/1976 | Oakes | B65H 35/0026 |
| | | | | 206/815 |
| D462,688 S | | 9/2002 | Schieffers et al. | |
| 6,832,725 B2 | | 12/2004 | Gardiner et al. | |
| 7,128,266 B2 | | 10/2006 | Zhu et al. | |
| 7,135,011 B2 | | 11/2006 | Powers et al. | |
| 7,159,783 B2 | | 1/2007 | Walczyk et al. | |

(Continued)

FOREIGN PATENT DOCUMENTS

CN    102641023 A    8/2012
CN    303119529 S    3/2015

(Continued)

OTHER PUBLICATIONS

International Search Report and Written Opinion for related application No. PCT/CN2017/082716, dated Jan. 26, 2018, 11 pages.

(Continued)

*Primary Examiner* — Adam J Waggenspack
(74) *Attorney, Agent, or Firm* — Additon, Higgins & Pendleton, P.A.

(57) ABSTRACT

An attachment apparatus for attaching an electronic device to at least one appendage of a user can include first and second receptacles that are each configured to releasably receive at least a portion of a respective digit of a user. Each of the first and second receptacles can be configured to at least partially receive the respective digit via relative movement between the receptacle and the respective digit in a first direction, and release the respective digit via relative movement between the receptacle and the respective digit in a second direction that is crosswise to the first direction.

18 Claims, 13 Drawing Sheets

(56) References Cited

U.S. PATENT DOCUMENTS

| | | | |
|---|---|---|---|
| 7,286,803 B2* | 10/2007 | Hamasaki | A45F 5/00 224/217 |
| 7,316,332 B2 | 1/2008 | Powers et al. | |
| 7,413,127 B2 | 8/2008 | Ehrhart et al. | |
| 7,726,575 B2 | 6/2010 | Wang et al. | |
| 8,260,384 B2* | 9/2012 | Wulff | A45F 5/00 224/267 |
| 8,294,969 B2 | 10/2012 | Plesko | |
| 8,317,105 B2 | 11/2012 | Kotlarsky et al. | |
| 8,322,622 B2 | 12/2012 | Liu | |
| D673,954 S | 1/2013 | Li et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,534,514 B2 | 9/2013 | Zhu et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |
| 8,910,875 B2 | 12/2014 | Ren et al. | |
| 8,914,290 B2 | 12/2014 | Hendrickson et al. | |
| 8,914,788 B2 | 12/2014 | Pettinelli et al. | |
| 8,915,439 B2 | 12/2014 | Feng et al. | |
| 8,915,444 B2 | 12/2014 | Havens et al. | |
| 8,916,789 B2 | 12/2014 | Woodburn | |
| 8,918,250 B2 | 12/2014 | Hollifield | |

(56) References Cited

U.S. PATENT DOCUMENTS

| | | |
|---|---|---|
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,638 B2 | 2/2015 | Wangercyn, Jr. et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |

(56) References Cited

U.S. PATENT DOCUMENTS

| | | | |
|---|---|---|---|
| D771,631 S | 11/2016 | Fitch et al. | |
| 9,481,186 B2 | 11/2016 | Bouverie et al. | |
| 9,488,986 B1 | 11/2016 | Solanki | |
| 9,489,782 B2 | 11/2016 | Payne et al. | |
| 9,490,540 B1 | 11/2016 | Davies et al. | |
| 9,491,729 B2 | 11/2016 | Rautiola et al. | |
| 9,497,092 B2 | 11/2016 | Gomez et al. | |
| 9,507,974 B1 | 11/2016 | Todeschini | |
| 9,519,814 B2 | 12/2016 | Cudzilo | |
| 9,521,331 B2 | 12/2016 | Bessettes et al. | |
| 9,530,038 B2 | 12/2016 | Xian et al. | |
| D777,166 S | 1/2017 | Bidwell et al. | |
| 9,558,386 B2 | 1/2017 | Yeakley | |
| 9,572,901 B2 | 2/2017 | Todeschini | |
| 9,606,581 B1 | 3/2017 | Howe et al. | |
| D783,601 S | 4/2017 | Schulte et al. | |
| D785,617 S | 5/2017 | Bidwell et al. | |
| D785,636 S | 5/2017 | Oberpriller et al. | |
| 9,646,189 B2 | 5/2017 | Lu et al. | |
| 9,646,191 B2 | 5/2017 | Unemyr et al. | |
| 9,652,648 B2 | 5/2017 | Ackley et al. | |
| 9,652,653 B2 | 5/2017 | Todeschini et al. | |
| 9,656,487 B2 | 5/2017 | Ho et al. | |
| 9,659,198 B2 | 5/2017 | Giordano et al. | |
| D790,505 S | 6/2017 | Vargo et al. | |
| D790,546 S | 6/2017 | Zhou et al. | |
| 9,680,282 B2 | 6/2017 | Hanenburg | |
| 9,697,401 B2 | 7/2017 | Feng et al. | |
| 9,701,140 B1 | 7/2017 | Alaganchetty et al. | |
| 2004/0111071 A1 | 6/2004 | Powers et al. | |
| 2004/0162534 A1 | 8/2004 | Powers et al. | |
| 2005/0124945 A1 | 6/2005 | Powers et al. | |
| 2007/0017997 A1 | 1/2007 | Talley et al. | |
| 2007/0063048 A1 | 3/2007 | Havens et al. | |
| 2007/0088298 A1 | 4/2007 | Powers et al. | |
| 2007/0171090 A1* | 7/2007 | Newman | G06K 7/10891 340/815.45 |
| 2008/0067193 A1 | 3/2008 | Powers et al. | |
| 2008/0078838 A1* | 4/2008 | Morris | G06K 7/10881 235/462.44 |
| 2009/0134221 A1 | 5/2009 | Zhu et al. | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2011/0169999 A1 | 7/2011 | Grunow et al. | |
| 2011/0202554 A1 | 8/2011 | Powilleit et al. | |
| 2012/0111946 A1 | 5/2012 | Golant | |
| 2012/0168512 A1 | 7/2012 | Kotlarsky et al. | |
| 2012/0193423 A1 | 8/2012 | Samek | |
| 2012/0203647 A1 | 8/2012 | Smith | |
| 2012/0223141 A1 | 9/2012 | Good et al. | |
| 2013/0043312 A1 | 2/2013 | Van Horn | |
| 2013/0075168 A1 | 3/2013 | Amundsen et al. | |
| 2013/0175341 A1 | 7/2013 | Kearney et al. | |
| 2013/0175343 A1 | 7/2013 | Good | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306731 A1 | 11/2013 | Pedraro | |
| 2013/0307964 A1 | 11/2013 | Bremer et al. | |
| 2013/0308625 A1 | 11/2013 | Park et al. | |
| 2013/0313324 A1 | 11/2013 | Koziol et al. | |
| 2013/0332524 A1 | 12/2013 | Fiala et al. | |
| 2014/0001267 A1 | 1/2014 | Giordano et al. | |
| 2014/0002828 A1 | 1/2014 | Laffargue et al. | |
| 2014/0025584 A1 | 1/2014 | Liu et al. | |
| 2014/0100813 A1 | 1/2014 | Showering | |
| 2014/0034734 A1 | 2/2014 | Sauerwein | |
| 2014/0039693 A1 | 2/2014 | Havens et al. | |
| 2014/0049120 A1 | 2/2014 | Kohtz et al. | |
| 2014/0049635 A1 | 2/2014 | Laffargue et al. | |
| 2014/0061306 A1 | 3/2014 | Wu et al. | |
| 2014/0063289 A1 | 3/2014 | Hussey et al. | |
| 2014/0066136 A1 | 3/2014 | Sauerwein et al. | |
| 2014/0067692 A1 | 3/2014 | Ye et al. | |
| 2014/0070005 A1 | 3/2014 | Nahill et al. | |
| 2014/0071840 A1 | 3/2014 | Venancio | |
| 2014/0074746 A1 | 3/2014 | Wang | |
| 2014/0076974 A1 | 3/2014 | Havens et al. | |
| 2014/0078342 A1 | 3/2014 | Li et al. | |
| 2014/0098792 A1 | 4/2014 | Wang et al. | |
| 2014/0100774 A1 | 4/2014 | Showering | |
| 2014/0103115 A1 | 4/2014 | Meier et al. | |
| 2014/0104413 A1 | 4/2014 | McCloskey et al. | |
| 2014/0104414 A1 | 4/2014 | McCloskey et al. | |
| 2014/0104416 A1 | 4/2014 | Giordano et al. | |
| 2014/0106725 A1 | 4/2014 | Sauerwein | |
| 2014/0108010 A1 | 4/2014 | Maltseff et al. | |
| 2014/0108402 A1 | 4/2014 | Gomez et al. | |
| 2014/0108682 A1 | 4/2014 | Caballero | |
| 2014/0110485 A1 | 4/2014 | Toa et al. | |
| 2014/0114530 A1 | 4/2014 | Fitch et al. | |
| 2014/0125853 A1 | 5/2014 | Wang | |
| 2014/0125999 A1 | 5/2014 | Longacre et al. | |
| 2014/0129378 A1 | 5/2014 | Richardson | |
| 2014/0131443 A1 | 5/2014 | Smith | |
| 2014/0131444 A1 | 5/2014 | Wang | |
| 2014/0133379 A1 | 5/2014 | Wang et al. | |
| 2014/0136208 A1 | 5/2014 | Maltseff et al. | |
| 2014/0140585 A1 | 5/2014 | Wang | |
| 2014/0152882 A1 | 6/2014 | Samek et al. | |
| 2014/0158770 A1 | 6/2014 | Sevier et al. | |
| 2014/0159869 A1 | 6/2014 | Zumsteg et al. | |
| 2014/0166755 A1 | 6/2014 | Liu et al. | |
| 2014/0166757 A1 | 6/2014 | Smith | |
| 2014/0168787 A1 | 6/2014 | Wang et al. | |
| 2014/0175165 A1 | 6/2014 | Havens et al. | |
| 2014/0191913 A1 | 7/2014 | Ge et al. | |
| 2014/0197239 A1 | 7/2014 | Havens et al. | |
| 2014/0197304 A1 | 7/2014 | Feng et al. | |
| 2014/0204268 A1 | 7/2014 | Grunow et al. | |
| 2014/0214631 A1 | 7/2014 | Hansen | |
| 2014/0217166 A1 | 8/2014 | Berthiaume et al. | |
| 2014/0217180 A1 | 8/2014 | Liu | |
| 2014/0231500 A1 | 8/2014 | Ehrhart et al. | |
| 2014/0247315 A1 | 9/2014 | Marty et al. | |
| 2014/0263493 A1 | 9/2014 | Amurgis et al. | |
| 2014/0263645 A1 | 9/2014 | Smith et al. | |
| 2014/0267116 A1 | 9/2014 | Weiner | |
| 2014/0270196 A1 | 9/2014 | Braho et al. | |
| 2014/0270229 A1 | 9/2014 | Braho | |
| 2014/0278387 A1 | 9/2014 | DiGregorio | |
| 2014/0282210 A1 | 9/2014 | Bianconi | |
| 2014/0288933 A1 | 9/2014 | Braho et al. | |
| 2014/0297058 A1 | 10/2014 | Barker et al. | |
| 2014/0299665 A1 | 10/2014 | Barber et al. | |
| 2014/0351317 A1 | 11/2014 | Smith et al. | |
| 2014/0362184 A1 | 12/2014 | Jovanovski et al. | |
| 2014/0363015 A1 | 12/2014 | Braho | |
| 2014/0369511 A1 | 12/2014 | Sheerin et al. | |
| 2014/0374483 A1 | 12/2014 | Lu | |
| 2014/0374485 A1 | 12/2014 | Xian et al. | |
| 2015/0001301 A1 | 1/2015 | Ouyang | |
| 2015/0009338 A1 | 1/2015 | Laffargue et al. | |
| 2015/0014416 A1 | 1/2015 | Kotlarsky et al. | |
| 2015/0021397 A1 | 1/2015 | Rueblinger et al. | |
| 2015/0028104 A1 | 1/2015 | Ma et al. | |
| 2015/0029002 A1 | 1/2015 | Yeakley et al. | |
| 2015/0032709 A1 | 1/2015 | Maloy et al. | |
| 2015/0039309 A1 | 2/2015 | Braho et al. | |
| 2015/0040378 A1 | 2/2015 | Saber et al. | |
| 2015/0049347 A1 | 2/2015 | Laffargue et al. | |
| 2015/0051992 A1 | 2/2015 | Smith | |
| 2015/0053769 A1 | 2/2015 | Thuries et al. | |
| 2015/0062366 A1 | 3/2015 | Liu et al. | |
| 2015/0063215 A1 | 3/2015 | Wang | |
| 2015/0088522 A1 | 3/2015 | Hendrickson et al. | |
| 2015/0096872 A1 | 4/2015 | Woodburn | |

(56) References Cited

U.S. PATENT DOCUMENTS

| | | |
|---|---|---|
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Percorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1* | 8/2016 | Oberpriller ............... A45F 5/00 |
| 2016/0232891 A1 | 8/2016 | Pecorari |
| 2016/0267310 A1 | 9/2016 | Alnasser et al. |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |

(56) References Cited

U.S. PATENT DOCUMENTS

| | | |
|---|---|---|
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |

FOREIGN PATENT DOCUMENTS

| | | |
|---|---|---|
| CN | 105466564 A | 4/2016 |
| WO | 2004052425 A2 | 6/2004 |
| WO | 2013163789 A1 | 11/2013 |

OTHER PUBLICATIONS

Technology Solutions; "1062 Bluetooth® HF RFID & Barcode Hand Scanner" Copyright 2015, 1 page [download available from https://www.tsl.com/products/1062-bluetooth-hf-rfid-barcode-hand-scanner/].

* cited by examiner

ATTACHMENT APPARATUS FOR ELECTRONIC DEVICE

FIELD OF THE INVENTION

The present invention relates to attachment apparatuses for electronic devices and, more particularly, to such attachment apparatuses that can be attached to users of the electronic devices.

BACKGROUND

Hand-held electronic devices are used in various environments to perform a variety of tasks. In some situations, a user may operate a hand-held electronic device repeatedly throughout an extended period of time. As an example, an employee working at a point-of-sale station in a retail store may frequently operate a hand-held imager, such as a laser scanner, for scanning barcodes on products to be sold.

When a user is required to operate the same hand-held electronic device over and over, it can be beneficial to attach the device to the user, such as the user's hand and/or wrist. Not only does this keep the device within easy accessibility for the user, it may also free the user's hands to perform other tasks. Because of these advantages, the user may be able to perform his or her duties more efficiently.

It is known for an electronic device to include or be associated with an attachment apparatus that is configured to attach to a user's finger. It is desirable for such attachment apparatuses to provide a new balance of properties.

SUMMARY

One aspect, of this disclosure is the provision of an attachment apparatus for attaching an electronic device to at least one digit of a user, the attachment apparatus comprising first and second receptacles that are each configured to releasably receive at least a portion of a respective digit of a user. Each of the first and second receptacles can be configured to at least partially receive the respective digit via relative movement between the receptacle and the respective digit in a first direction, and release the respective digit via relative movement between the receptacle and the respective digit in a second direction that is crosswise to the first direction.

For example, the can be in combination with the electronic device. The electronic device can include a switch mechanism proximate the first receptacle. The first receptacle can be positioned between the switch mechanism and the second receptacle.

As an example, the attachment apparatus can include a support structure configured to support at least a portion of the electronic device. The first and second receptacles can each be connected to the support structure.

In an example, the support structure can have opposite first and second sides; the first side is configured to have at least a portion of the electronic device positioned proximate the first side of the support structure; and the first and second receptacles are positioned proximate the second side of the support structure.

In an example, the first and second receptacles comprise extension members, and proximal portions of the extension members extend away from the second side of the support structure.

In an example, at least a portion of an electronic device is connected to the first side of the support structure; the electronic device comprises a switch mechanism proximate the first receptacle; and the first receptacle is positioned between the switch mechanism and the second receptacle.

In an example, the first receptacle comprises a first partial band connected to the support structure and extending partially around a first area configured to receive the respective digit, and the second receptacle comprises a second partial band connected to the support structure and extending partially around an area configured to receive the respective digit.

In an example, the first and second areas are adjacent to one another and open to one another.

In an example, the attachment apparatus comprises a protrusion at least partially separating the first and second areas from one another.

In an example, the protrusion is a third partial band connected to the support structure, and the first partial band extends partially around the third partial band.

An aspect of this disclosure is the provision of an attachment apparatus for attaching an electronic device to at least one digit of a user, the attachment apparatus comprising: support structure; a first partial band extending from the support structure at least partially around a first inner area configured to at least partially receive at least a first digit of a user; and a second partial band extending from the support structure at least partially around a second inner area configured to at least partially receive at least a second digit of the user, wherein each of the first and second inner areas is configured to at least partially receive the respective digit via relative movement between the inner area receptacle and the respective digit in a first direction, and release the respective digit via relative movement between the receptacle and the respective digit in a second direction that is crosswise to the first direction.

In an example, the first and second areas are adjacent to one another and open to one another.

In an example, the attachment apparatus comprises a protrusion at least partially separating the first and second areas from one another.

In an example, the protrusion is a third partial band connected to the support structure, and the first partial band extends partially around the third partial band.

In one example, at least one of the two or more receptacles can be configured in a manner that seeks to allow the electronic device to be manually stabilized, such as for improving functionality of the electronic device. For example, when an electronic device is fastened to a user and includes an imager, for example a laser scanner for scanning barcodes, too much instability associated with the attachment apparatus may decrease clarity of the image or scan captured by the electronic device.

As another example, at least one of the two or more receptacles can be configured so that the attachment apparatus is readily detachable from (e.g., can "breakaway" from) the user's digit(s) in the case of an emergency, for example if the electronic device becomes caught in moving parts of machinery or otherwise becomes undesirably stuck.

The foregoing summary provides a few brief examples and is not exhaustive, and the present invention is not limited to the foregoing examples. The foregoing examples, as well as other examples, are further explained in the following detailed description with reference to accompanying drawings.

DETAILED DESCRIPTION

An aspect of this disclosure is the provision of an attachment apparatus that may be used to attach an electronic device to at least one appendage (e.g., finger) of a user. As examples, several embodiments of electronic devices including attachment apparatuses are disclosed in the following. The present invention may, however, be embodied in many different forms and should not be construed as limited to the embodiments set forth herein. For example, features disclosed as part of one embodiment can be used in the context of another embodiment to yield a further embodiment.

Figure 1:
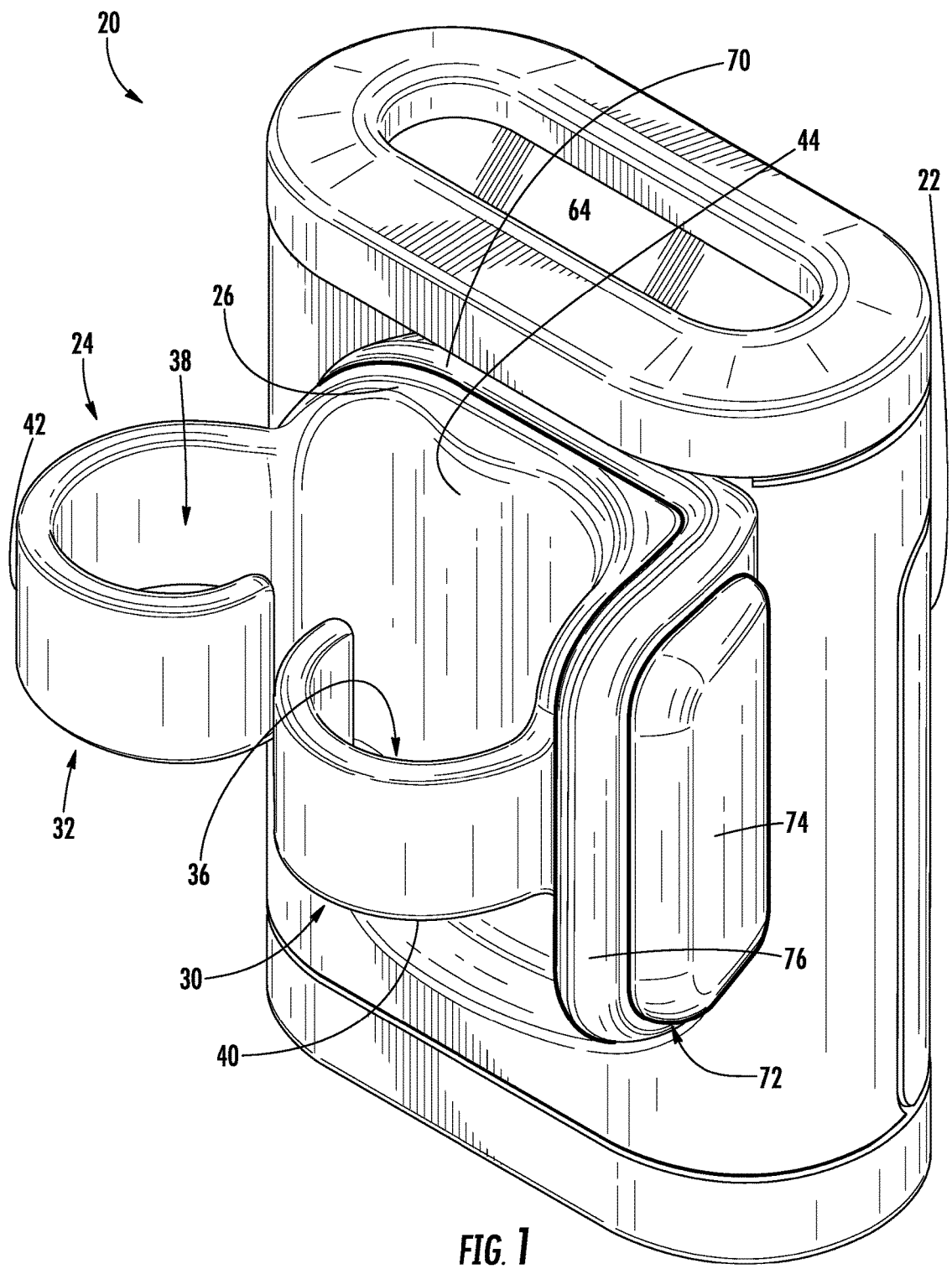
FIG. 1 is front, bottom, right pictorial view of an electronic device, wherein the electronic device includes an attachment apparatus, in accordance with a first embodiment of this disclosure.
Figure 2:
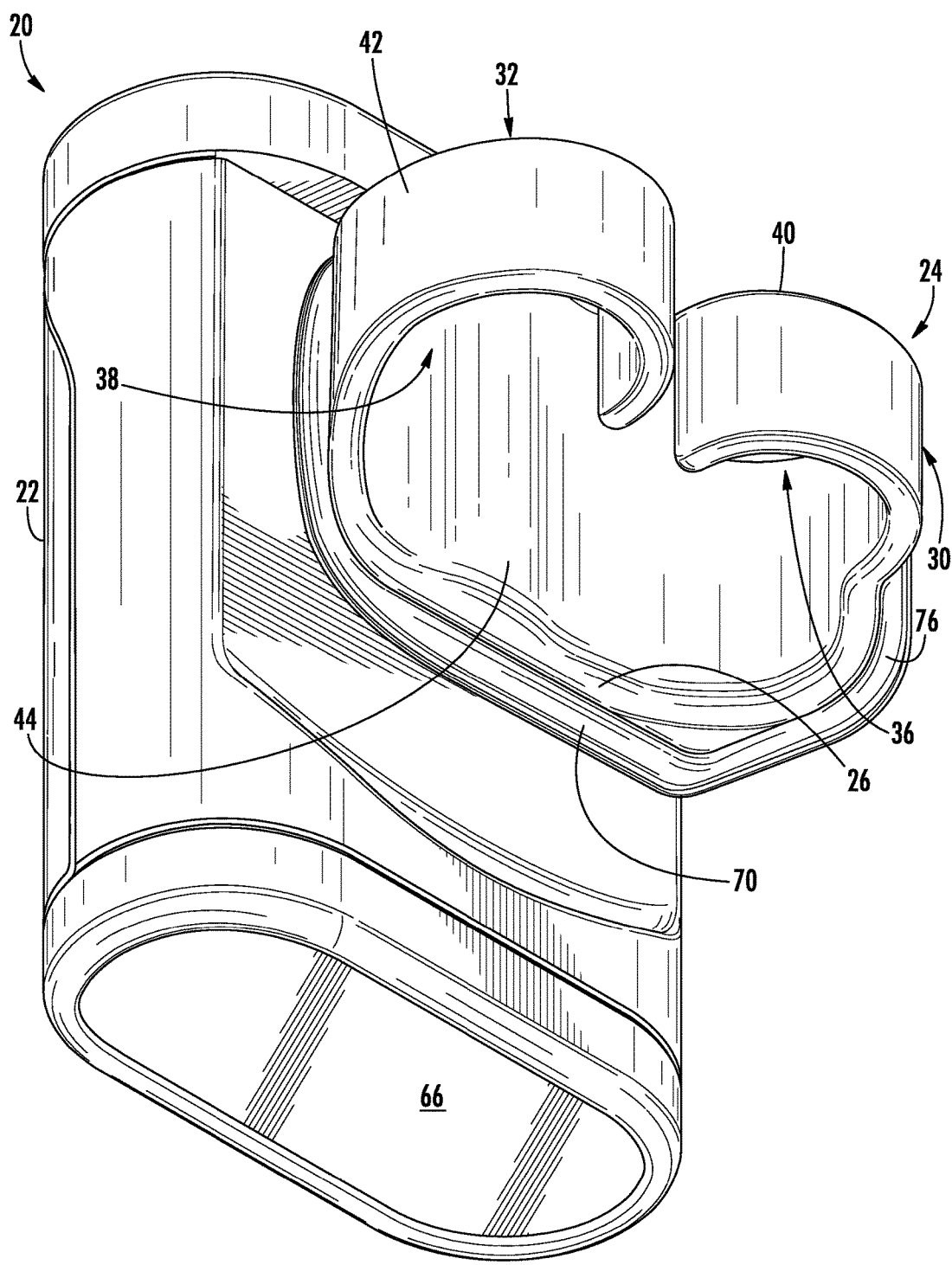
FIG. 2 is a rear, bottom, left pictorial view of the electronic device of FIG. 1.

FIGS. 1 and 2 are pictorial views of a hand-held electronic device 20 in accordance with a first embodiment of this disclosure. In the example shown in FIGS. 1 and 2, the electronic device 20 includes a frame or housing 22, and an attachment apparatus 24 is mounted to a lower portion, base or lower wall of the housing. The attachment apparatus 24 can include an upper support structure 26 connected to the housing 22 and configured to be used in supporting, or at least partially supporting, the housing. The support structure 26 can be in the form of a slab of material. Alternatively, support structure 26 can be part of the housing 22, for example so that the attachment apparatus 24 may include at least a portion of the housing.

The attachment apparatus 24 can further include one, two, or more receptacles, for example first and second receptacles 30, 32 (e.g., receptacles for fingers) that are connected to, supported by and/or otherwise associated with the support structure 26. For ease of discussion, and not for the purpose of limiting the scope of this disclosure, the first and second receptacles 30, 32 and other features can be referred to with the same frame of reference used in the above description of the drawings. Accordingly and referring to the front view of the electronic device 20 in FIG. 3, the first and second receptacles 30, 32 can be respectively referred to as right and left receptacles 30, 32.

As will be discussed in greater detail below, the right and left receptacles 30, 32 can be configured to releasably receive at least a portion of at least one appendage of a user. In the specific examples discussed in greater detail below, each of the receptacles 30, 32 is configured to at least partially receive a portion of a respective digit of a user, so that the user can support the electronic device 20 by hand, by way of the attachment apparatus 24. For example, each of receptacles 30, 32 can be configured to releasably receive a portion of at least one finger of a user, so that the user's hand can support the electronic device 20 by way of the attachment apparatus 24.

Figure 3:
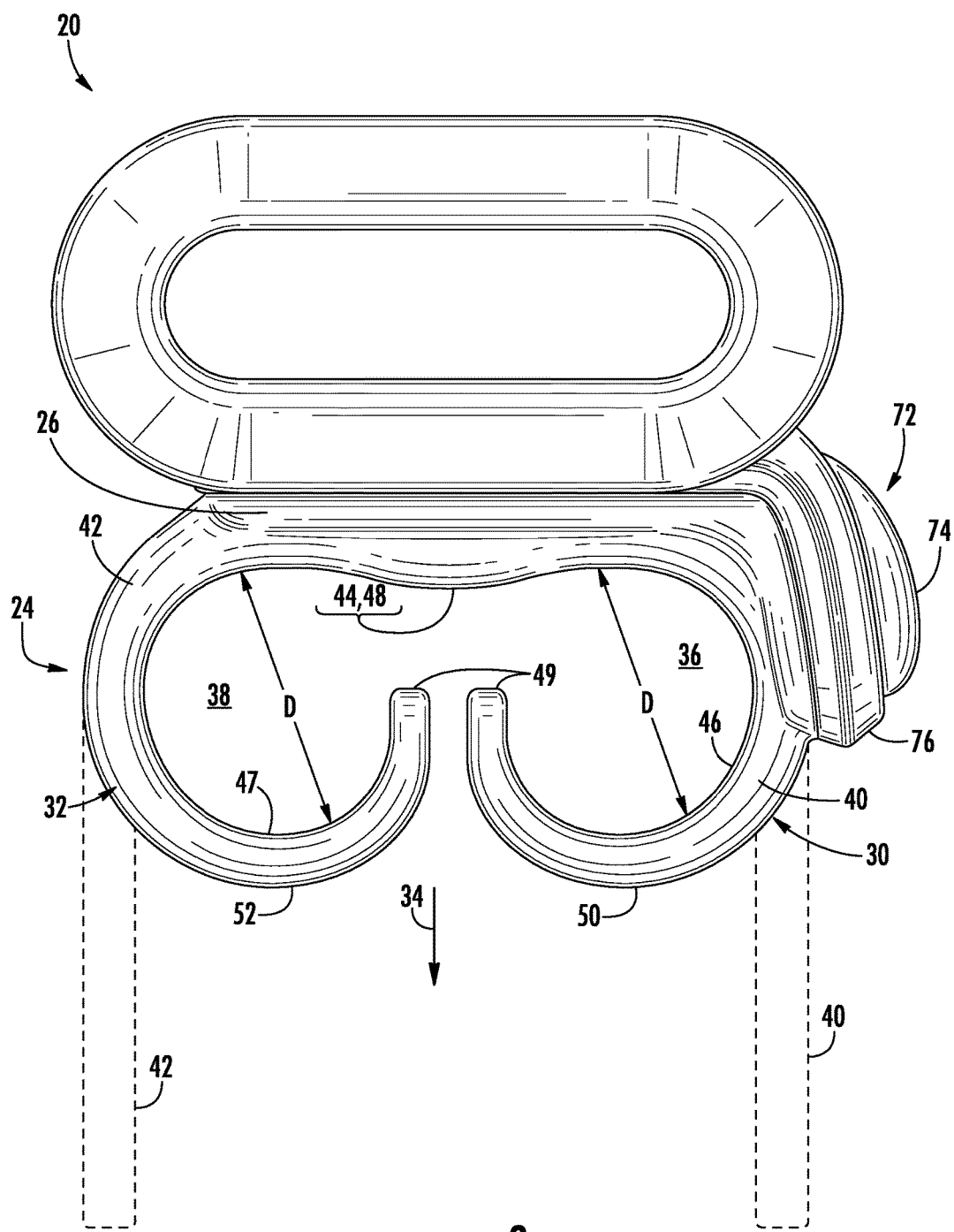
FIG. 3 is a front elevation view of the electronic device of FIG. 1, wherein dashed lines in FIG. 3 schematically depict receptacles (e.g., receptacles for fingers) in a relatively widely open configuration.

As will also be discussed in greater detail below for the first embodiment, solid lines in FIG. 3 illustrate the right and left receptacles 30, 32 in their normal, relaxed (e.g., non-strained), substantially closed configuration. In the first embodiment, the attachment apparatus 24, or at least portions of the receptacles 30, 32, are formed from, or otherwise comprise, elastic material and/or comprise other suitable biasing mechanisms (e.g., springs) so that the right and left receptacles are biased toward the relaxed, substantially closed configuration depicted in FIGS. 1 and 2, and depicted with solid lines in FIG. 3.

Figure 4:
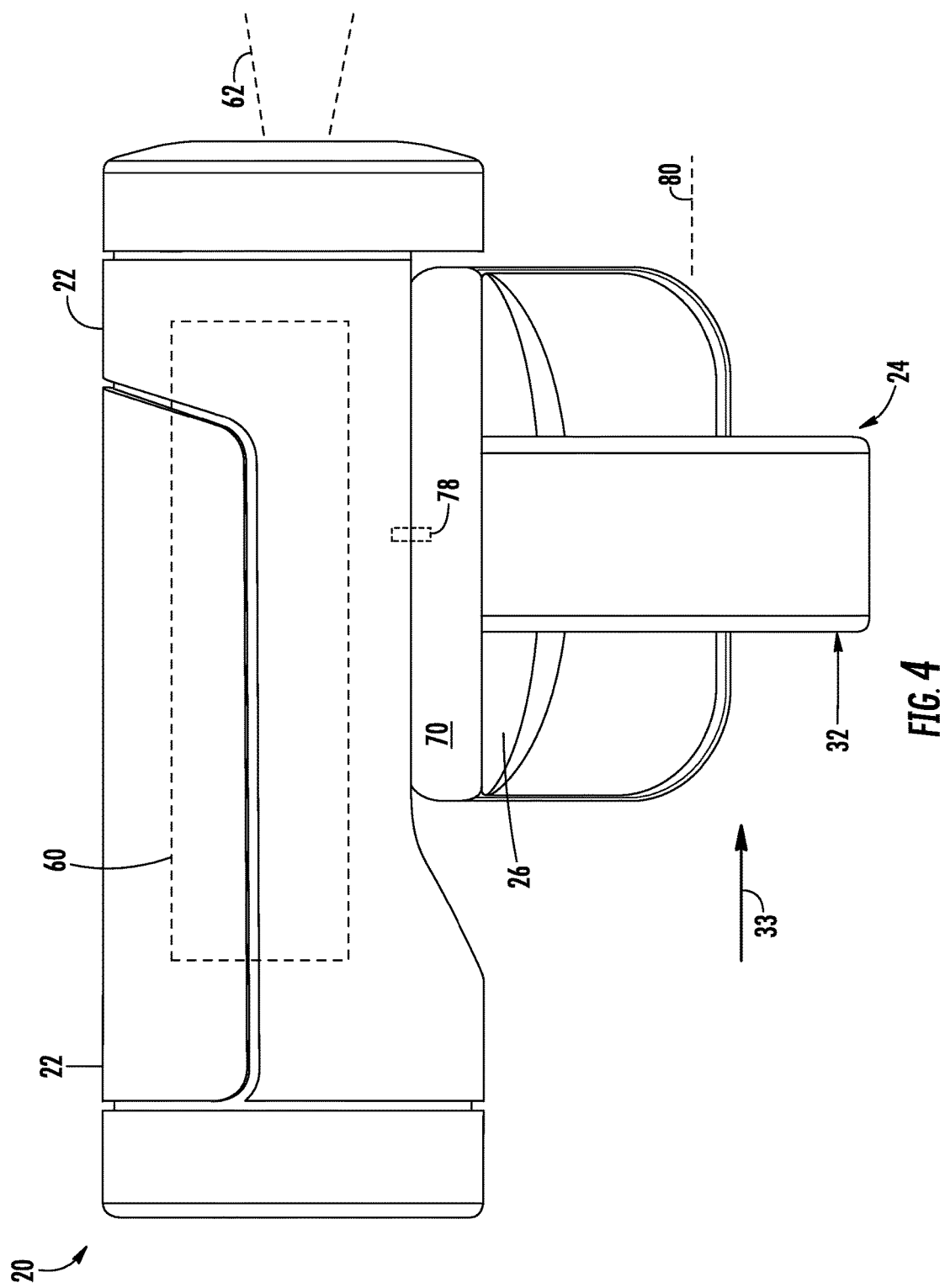
FIG. 4 is a schematic left elevation view of the electronic device of FIG. 1.

The receptacles 30, 32 can at least partially receive the respective fingers via relative movement between the receptacles and the respective fingers in a first direction schematically represented in FIG. 4 by arrow 33. In substantially closed configurations of the first embodiment, the receptacles 30, 32 are configured in a manner that seeks to allow portions of a user's respective fingers to be securely, yet releasably, held within inner areas 36, 38 (FIGS. 1-3) of the receptacles, so that the user can hold and securely stabilize the electronic device 20 by way of his or her respective fingers and the support structure 26. More generally, the receptacles 30, 32 can be configured to removably receive receive digit(s) (e.g., finger(s) or thumb(s)), wrist(s), hand(s) or other suitable appendage(s) of a user.

Dashed lines in FIG. 3 schematically illustrate what is believed to be a possible, non-limiting example of the receptacles 30, 32 in a relatively widely open configuration that can be achieved by applying predetermined forces that deform (e.g., elastically deform) the attachment apparatus 24. In the relatively widely open configuration of the first embodiment, the receptacles 30, 32 are configured in a manner that seeks to allow portions of a user's respective fingers to be released from the relatively widely opened inner areas 36, 38 of the receptacles, so that the receptacles 30, 32 are configured to provide a "breakaway" feature for allowing the attachment apparatus 24 to be readily detachable from the user's fingers, or the like, in the case of an emergency. For example, such an emergency my include the electronic device 20 accidently becoming caught in moving parts of machinery or otherwise becoming undesirably stuck.

In the first embodiment, the receptacles 30, 32 can release the respective fingers via relative movement between the receptacles and the respective fingers in a second direction schematically represented in FIG. 3 by arrow 34. In the first embodiment, the second direction 34 (e.g., emergency removal direction) is crosswise to, or more specifically can be perpendicular to, the first or insertion direction 33 (FIG. 4). The substantially closed and relatively widely open configurations of the receptacles 30, 32 are discussed in greater detail below, after further discussion of structures of the electronic device 20 and attachment apparatus 24.

At least partially reiterating from above for the first embodiment, the right and left receptacle 30, 32 respectively comprise the right and left inner areas 36, 38. More specifically, the attachment apparatus 24 can include first, second and third lower portions or extension members 40, 42, 44 that at least partially form the receptacles 30, 32 and further at least partially define the inner areas 36, 38. In the example shown in FIGS. 1-3, the lower portions or extension members 40, 42, 44 are connected to and extend downwardly from the upper support structure 26 of the attachment apparatus 24. The first, second and third portions 40, 42, 44 can be respectively referred to as a right partial band 40, left partial band 42, and a protrusion or protruding intermediate rib 44. Each of the extension members or partial bands 40, 42 can be arcuate and generally in the form of a C-shaped band or C-band. For example, the partial bands 40, 42 can be curved members having a profile with a shape in the form of, or substantially in the form of, the letter "C".

In the example depicted in FIG. 3, at least a portion of the electronic device 20, or more specifically the electronic device housing 22, extends generally upwardly from, or upwardly from proximate, a first or upper side of the support structure 26. In contrast, proximal portions of the extension members or partial bands 40, 42 can extend generally downwardly from, or downwardly from proximate, a second or lower side of the support structure 26. For example, the proximal portions of the partial bands 40, 42 can extend downwardly from, or downwardly from proximate, opposite right and left ends of the support structure 26. Additionally, the proximal portions of the partial bands 40, 42 can extend outwardly, away from one another so that those proximal portions extend divergently with respect to one another in the downward direction. Distal portions of the partial bands 40, 42 can extend inwardly from the proximal portions of the partial bands, so that the distal portions extend convergently toward one another.

Referring to FIG. 3, the partial bands 40, 42 can respectively include arcuate, concave inner surfaces 46, 47, and arcuate, convex outer surfaces 50, 52. Relative to the inner areas 36, 38, the intermediate member or intermediate rib 44 can be in the form of an inwardly protruding structure (e.g., protrusion) that extends along the length of the support structure 26 to at least partially separate the inner areas 36, 38 from one another, wherein the length extends from the front to the ear of the support structure. An inner surface 48 of the intermediate member 44 can be arcuate, or more specifically convex. Opposite ends of the intermediate member's inner surface 48 can be contiguous with respective ends of the inner surfaces 46, 47 of the partial bands 40, 42 so that the inner areas 36, 38 are substantially cylindrical in shape. Notwithstanding, different shapes and configurations from those discussed in this Detailed Description section are within the scope of this disclosure.

In the example shown in FIG. 3, the right partial band 40 extends from the right end of the support structure 26 to the free end 49 of the right partial band in an arcuate, clockwise direction, so that the inner surface 46 extends partially around and at least partially defines the right inner area 36. As also shown in the example of FIG. 3, the left partial band 42 extends from the left end of the support structure 26 to the free end 49 of the left partial band in an arcuate, counter-clockwise direction so that the inner surface 47 extends partially around and at least partially defines the left inner area 38.

In the first embodiment, the free ends 49 of the partial bands 40, 42 are not fixedly connected to the intermediate rib 44, or the like, and, thus, the partial bands are not in the form of complete bands that are endless. As a more specific example, FIG. 3 depicts with solid lines an example of the support structure 26 in a relaxed condition in which the free ends 49 of the partial bands 40, 42 are spaced apart from the intermediate rib 44. In the example of FIG. 3, the inner areas 36, 38 are open to one another across gaps defined between the partial band's free ends 49 and the inner surface 48 of the intermediate rib 44; and the inner areas 36, 38 are also outwardly open through a gap defined between adjacent portions of the outer surfaces 50, 52 of the partial bands 40, 42.

In an alternative embodiment, it is believed that the free ends 49 of the partial bands 40, 42 may engage against the inner surface 48 of the intermediate rib 44 and/or adjacent portions of the outer surfaces 50, 52 of the partial bands 40, 42 may engage against one another. In that alternative embodiment the partial bands 40, 42 can be constructed of, or otherwise comprise, elastic material, or the like, so that the above-mentioned gaps can be formed in response to predetermined elastic deformation of the partial bands. Accordingly, in that alternative embodiment the partial bands 40, 42 can still be referred to as partial bands because they are configured to allow, in response to the application of predetermined force(s), the above-mentioned gaps to be formed. Accordingly, in the first embodiment and the above-discussed alternative embodiment, the term "substantially" can be used, for example, in the description or identification of the relaxed, substantially closed configuration of the receptacles 30, 32 (e.g., because the above-mentioned gaps can be closed or partially open in the substantially closed configurations).

The electronic device 20 can be or can include a camera, optical imager, laser scanner, laser pointer, counting device, calculation device, or other suitable portable electronic device(s). As a more specific example schematically shown in FIG. 4, the housing 22 of the electronic device 20 can at least partially contain (e.g., hide from view) conventional components 60 such as, but not limited to, an optical imager, conventional laser scanner and/or other conventional features configured to capture images or signals associated with symbologies (e.g., barcodes) for decoding purposes, so that the symbologies, or more specifically barcodes, can be decoded. Optionally, the electronic device 20 can be associated with one or more other electronic devices that operate cooperatively with the electronic device 20 to facilitate the decoding and/or perform other functions.

As schematically shown in the example of FIG. 4, a field of view 62 of the electronic device 20 extends forwardly, outwardly from at least one opening and/or transparent window 64 (FIG. 1) at the front end of the electronic device. In addition, the electronic device 20 can include at least one user interface in the form of an electronic visual display 66 (FIG. 2) at the rear end of the electronic device 20. Alternatively, other and/or additional peripheral or an ancillary devices may be associated with the electronic device 20 for providing information to and/or and receiving information from the electronic device.

In the first embodiment, the electronic device 20 includes a mounting structure in the form of a mounting platform 70 (FIGS. 1, 2 and 4) connected between the electronic device housing 22 and the attachment apparatus 24, so that the attachment apparatus is mounted to the device housing 22 by way of the mounting platform. Upper and lower surfaces of the mounting platform 70 can be in opposing face-face relation (e.g., contact) with respect to a lower surface of the housing 22 and an upper surface of the support structure 26 of attachment apparatus 24. Alternatively, the mounting platform 70 can be omitted so that the attachment apparatus 24 is mounted directly to the housing 22 and/or the attachment apparatus can be mounted to the housing by way of one or more features other than, or in addition to, the mounting platform, as discussed in greater detail below. As another example, the partial bands 40, 42 can be connected directly to, or integrally formed with, the housing 22 of the electronic device 20, so that the support structure 26 can be part of the frame or housing of the electronic device, as discussed in greater detail below.

The electronic device 20 of the first embodiment further includes a switch mechanism 72 (FIGS. 1-3) positioned adjacent to the attachment apparatus 24. The first or right receptacle 30 can be positioned between the switch mechanism 72 and the second or left receptacle 32. The switch mechanism 72 (FIGS. 1-3) can be in the form of a trigger, lever, pushbutton (e.g., key) or other suitable mechanism that optionally can be positioned adjacent to the attachment apparatus 24. For example, the switch mechanism 72 can be associated with (e.g., conventionally electrically connected to) the conventional internal components 60 (FIG. 4) of the electronic device 20 for actuating the optical imager, laser scanner and/or other suitable feature(s) of the electronic device.

The switch 72 can be mounted to, or otherwise incorporated into or associated with, the mounting platform 70. In the first embodiment, the switch 72 includes a pushbutton 74 movably (e.g., reciprocatively) mounted to a button housing 76. The button housing 76 can extend at a non-zero angle from the mounting platform 70. As another example, the button housing 76 can be an obliquely extending (e.g., downwardly and outwardly extending) portion of the mounting platform 70 and/or any other suitable panel portion or structure connected to the mounting platform. Alternatively, the button housing 76 can be an obliquely extending (e.g., downwardly and outwardly extending) portion of the housing 22 and/or any other suitable panel portion or structure connected to the housing, as discussed in greater detail below.

In the first embodiment, the attachment apparatus 24 is fixedly connected to the mounting platform 70, for example by the upper surface of the support structure 26 being fixedly connected to the lower surface of the mounting platform, and a portion of the outer surface 50 of the right partial band 40 being fixedly connected to an inner surface of the pushbutton housing portion 76 of the mounting platform. The fixed connection between the attachment apparatus 24 and the mounting platform 70 can include mechanical fasteners, adhesive material, injection-molded connections between the attachment apparatus and the mounting platform, and/or any other suitable connecting features. The mounting platform 70 can be similarly fixedly connected to the electronic device housing 22, for example by way of at least one fastener 78 (FIG. 4) and/or any other suitable fasteners. As schematically depicted with dashed lines in FIG. 4, the fastener 78 can be hidden from view, and the fastener may include at least one screw, nut and bolt, and/or any other suitable features.

Figure 5:
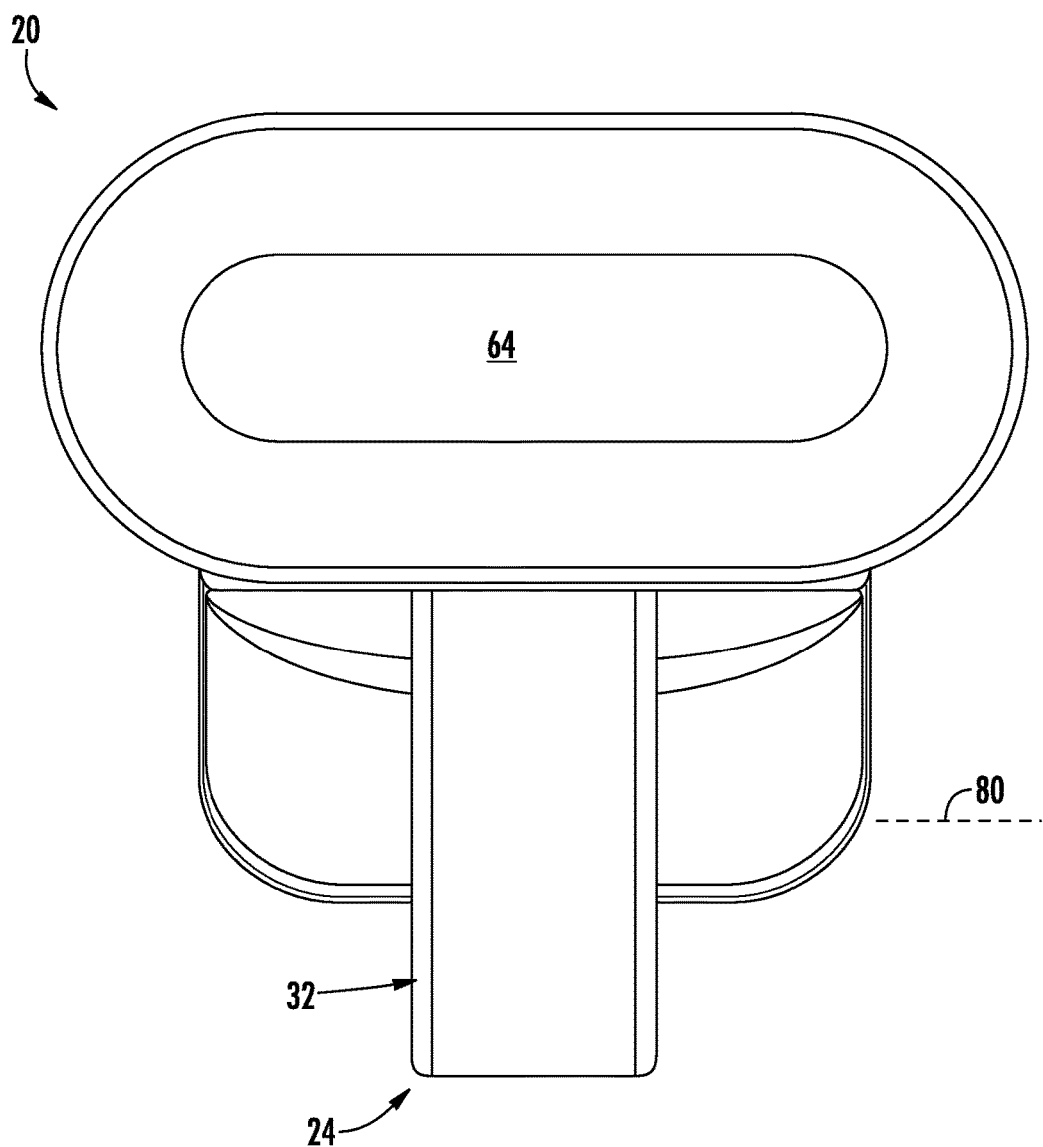
FIG. 5 is a schematic front elevation view of the electronic device of FIG. 1, wherein an attachment apparatus of the electronic device is in a different configuration as compared to FIGS. 1-4.
Figure 6:
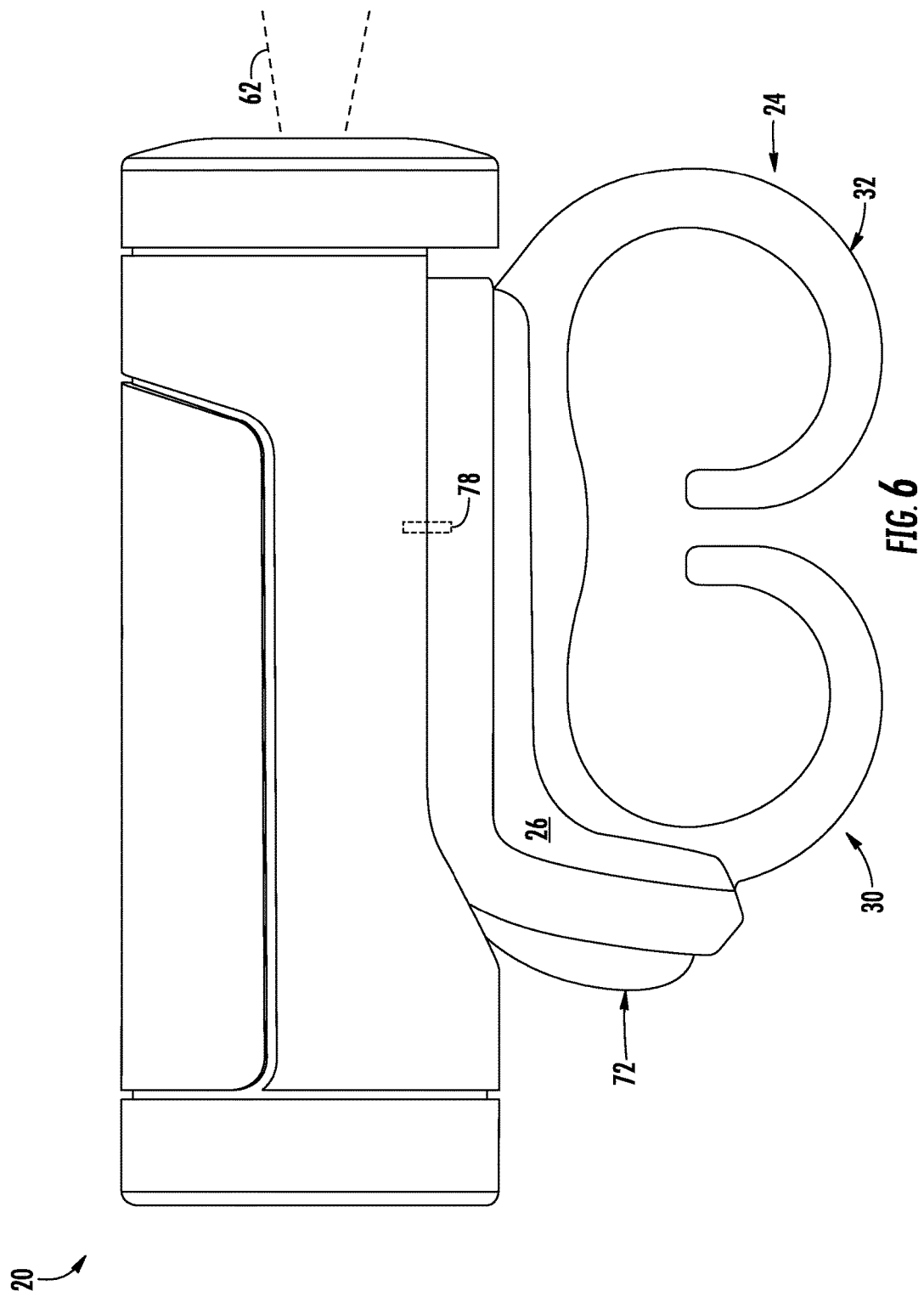
FIG. 6 is a schematic left elevation view of the electronic device in the configuration of FIG. 5.

As another example, the fastener 78 (FIG. 4) can include a pivot joint, for example at least one pivot pin, configured so that the mounting platform 70 is selectively rotatably connected to the electronic device housing 22. The mounting platform 70 can be rotatably connected to the electronic device housing 22 so that the mounting platform can be rotated relative to the housing 22 at least between an aligned configuration (FIGS. 1-4) and a crosswise configuration (FIGS. 5 and 6). The attachment apparatus 24 can be fixedly connected to the mounting platform 70 for rotating with the mounting platform relative to the housing 22. Similarly, the switch mechanism 72 (FIGS. 1-3) can be connected to the mounting platform 70 for rotating with the mounting platform relative to the housing 22 through, for example, 180 degrees or any other suitable amount, so that the electronic device 20 is reconfigurable between right-handed and left-hand configurations.

Referring to FIG. 4, in the aligned configuration, the lengthwise axes 80 of the inner areas 36, 38 (FIGS. 1-3) can extend along, or substantially parallel to, the field of view 62. Referring to FIGS. 5 and 6, in the crosswise configuration, the lengthwise axes 80 (FIG. 5) of the inner areas 36, 38 can extend crosswise to, or substantially perpendicular to, the field of view 62 (FIG. 6).

The electronic device 20 can include one or more features, for example, detents, inference fits, or the like, for releasably securing the mounting platform 70 in the aligned configuration (FIGS. 1-4) and crosswise configuration (FIGS. 5 and 6). As another example, in one version of the first embodiment, the mounting platform 70 can be fixedly secured in the aligned configuration (FIGS. 1-4), and in another version of the first embodiment the mounting platform can be fixedly secured in the crosswise configuration. Other suitable relative arrangements between features of the electronic device 20 (e.g., between the lengthwise axes 80 and field of view 62) are within the scope of this disclosure.

As one example of a method of use, while the attachment apparatus 24 is in its relaxed, substantially closed configuration, two of a user's adjacent and straight fingers can be respectively introduced into the inner areas 36, 38 by causing relative movement between the two fingers and the inner areas 36, 38 while the lengthwise axes of the straight fingers are substantially coaxial with the respective lengthwise axes 80 (FIGS. 4 and 5) of the inner areas. For example, the receptacles 30, 32 can at least partially receive the respective fingers via relative movement between the receptacles and the respective fingers in the first or insertion direction 33 (FIG. 4).

In accordance with the first embodiment, the receptacles 30, 32 (e.g., at least the partial bands 40, 42) are configured to allow a user with fingers positioned in the inner areas 36, 38 and substantially encompassed and securely engaged by the inner surfaces 46, 47, 48 to hold and securely stabilize the electronic device 20 by way of the receptacles during the substantially closed configurations (e.g., shown in solid lines in FIG. 3), so that substantially clear images and/or signals can be captured by the electronic device 20. That is, the receptacles 30, 32, partial bands 40, 42 and/or other features of the attachment apparatus 24 can be configured to function as a stable support for the electronic device 20. For example, the partial bands 40, 42 can be elastically configured to provided inwardly directed forces against the fingers in the inner areas 36, 38.

In another example of a method of use, while portions of a user's fingers are respectively in the inner areas 36, 38 and the attachment apparatus 24 is in its substantially closed configuration, the receptacles 30, 32 can be forced into their relatively widely open configurations (e.g., shown in dashed lines in FIG. 3) by causing crosswise, or more specifically perpendicular, relative movement between the subject fingers and the lengthwise axes 80 (FIGS. 4 and 5) of the inner areas 36, 38 (FIGS. 1-3). For example, the receptacles 30, 32 can release the subject fingers via relative movement between the receptacles and the fingers in the second or emergency removal direction 34 (FIG. 3). Reiterating from above, the first or insertion direction 33 can be crosswise to, or more specifically can be perpendicular to, the second or emergency removal direction 34.

In the first embodiment, the receptacles 30, 32 (e.g., at least the partial bands 40, 42) are configured in a manner that seeks to allow the attachment apparatus 24 to become automatically reconfigured to the relatively widely open configuration (e.g., shown in dashed lines in FIG. 3) in response to predetermined forces, so that the attachment apparatus is detachable from the user's fingers, or the like, in the case of an emergency, for example if the electronic device becomes caught in moving parts of machinery or otherwise becomes undesirably stuck. That is, the receptacles 30, 32, partial bands 40, 42 and/or other features of the attachment apparatus 24 can be elastically configured to provide a "breakaway" feature for allowing the attachment apparatus to be readily detachable from the user's fingers.

In accordance with the first embodiment, the attachment apparatus 24 is configured so that, when the respective portions of the fingers are fully inserted into the inner areas 36, 38, the inner surfaces 46, 47 of the partial bands 40, 42 substantially encompass and securely engage the exterior of the portions of the fingers therein, so that the user can hold and securely stabilize the electronic device 20 by way of support structure 26. In the first embodiment, the thumb of the hand with fingers in the inner areas 36, 38 is proximate the pushbutton 74, so that the thumb can be used to press or otherwise actuate the pushbutton or other suitable switch mechanism. The receptacles 30, 32 are configured in a manner that seeks to allow the user to simultaneously: press or otherwise actuate the pushbutton 74, or the like; and hold and securely stabilize the electronic device 20 by way of support structure 26.

As one example, the attachment apparatus 24 is constructed of elastic material so that there can be a range of substantially closed configurations (e.g., in which the user's fingers are substantially encompassed and securely engaged by the inner surfaces 46, 47, 48) for differently sized users' fingers. For example, the receptacles 30, 32, or more specifically the inner surfaces 46, 47, define expandable, substantially cylindrical shapes (e.g., inner areas 36, 38) having an inner diameter D (FIG. 3) that can range from about 15.5 mm to about 28 mm (which approximately corresponds to U.S. ring sizes ranging from about 5 to about 20) so as to substantially encompass and securely engage differently sized fingers. When the partial bands 40, 42 are expanded or forced outward to accommodate a larger finger or ring size, the gap between the free ends 49 typically remains small enough so that the inner surfaces 46, 47 of the partial bands 40, 42 continue to substantially encompass and securely engage the exterior of the portions of the fingers in the inner areas 36, 38, so that the user can hold and securely stabilize the electronic device 20 by way of support structure 26. In contrast, in the relatively widely open configuration, the gap between the free ends 49 becomes sufficiently large so that the fingers can freely pass through the gap and exit the inner areas 36, 38.

Reiterating from above, the attachment apparatus 24, or at least portions of the receptacles 30, 32, can be formed from, or otherwise comprise, elastic material and/or comprise other suitable biasing mechanisms (e.g., springs) so that the right and left receptacles are biased toward the relaxed, substantially closed configuration. More specifically, the attachment apparatus 24 can be formed from a moldable material in a single mold so that all components of the attachment apparatus are integrally formed and integrally connected to one another. The moldable material can be a suitable elastic rubber material, for example urethane or polyurethane. The rubber material can have a hardness in the range from about Shore 70A to about Shore 90A, preferably (e.g., optionally) with a hardness of about Shore 80A. It is believed that such a hardness can provide sufficiently secure attachment to fingers or gloved fingers within the ranges of ring sizes of 5 to 20. It is believed that such hardness can provide a reasonably tight enough fit to securely mount the attachment apparatus 24 to a suitable range of finger sizes, without causing discomfort to the user. It is believed that such hardness would allow expansion to various ring sizes and also enable the breakaway feature. Also, the rubber material of the attachment apparatus may be more easily cleaned as compared, for example, to at least some fabric materials.

As additional examples, second through fourth embodiments of this disclosure are described in the following. The first through fourth embodiments can be structurally and functionally alike, except for variations noted and variations that will be apparent to those of ordinary skill in the art.

Figure 7:
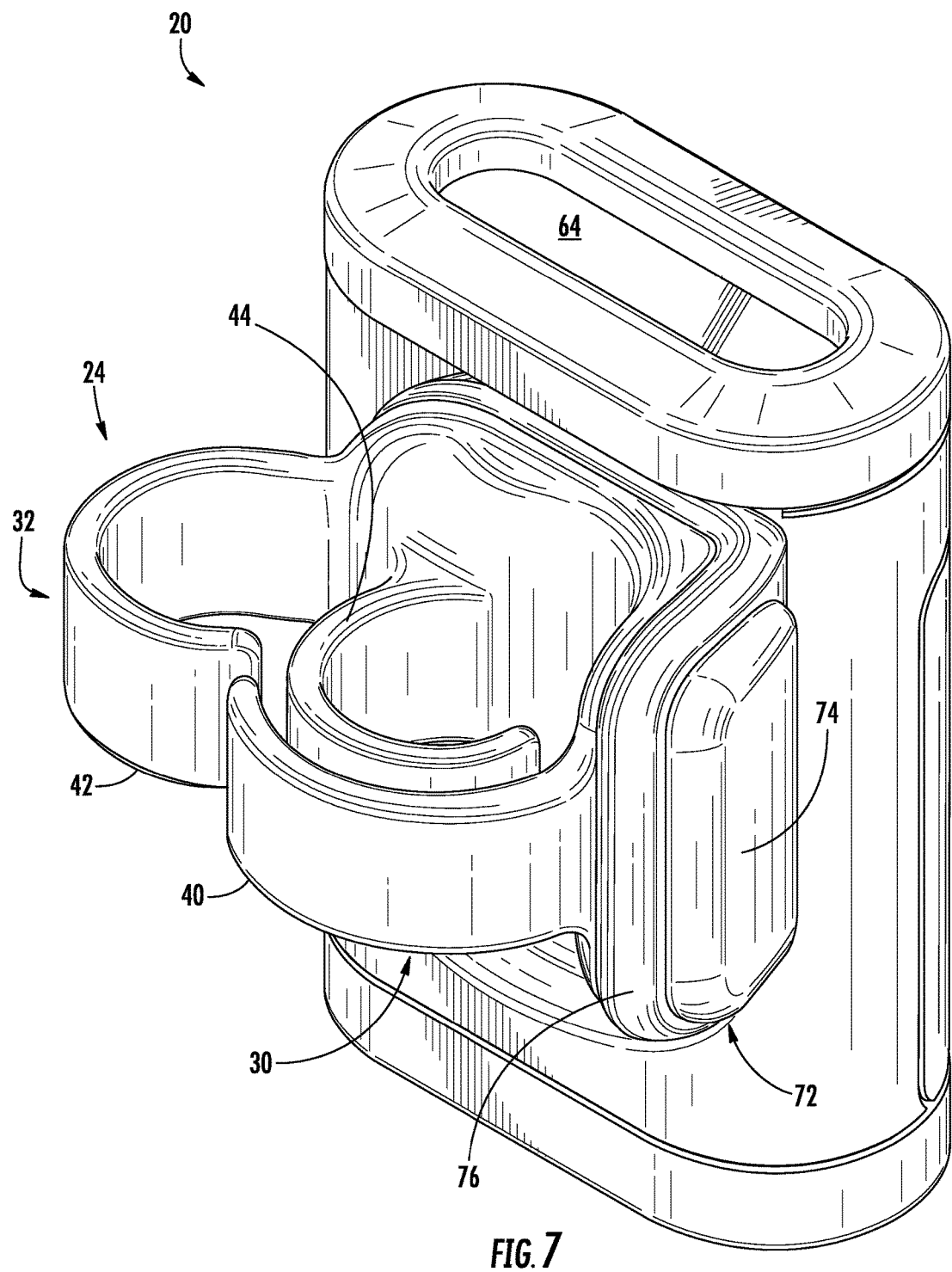
FIG. 7 is front, bottom, right pictorial view of an electronic device, wherein the electronic device includes an attachment apparatus, in accordance with a second embodiment of this disclosure.
Figure 8:
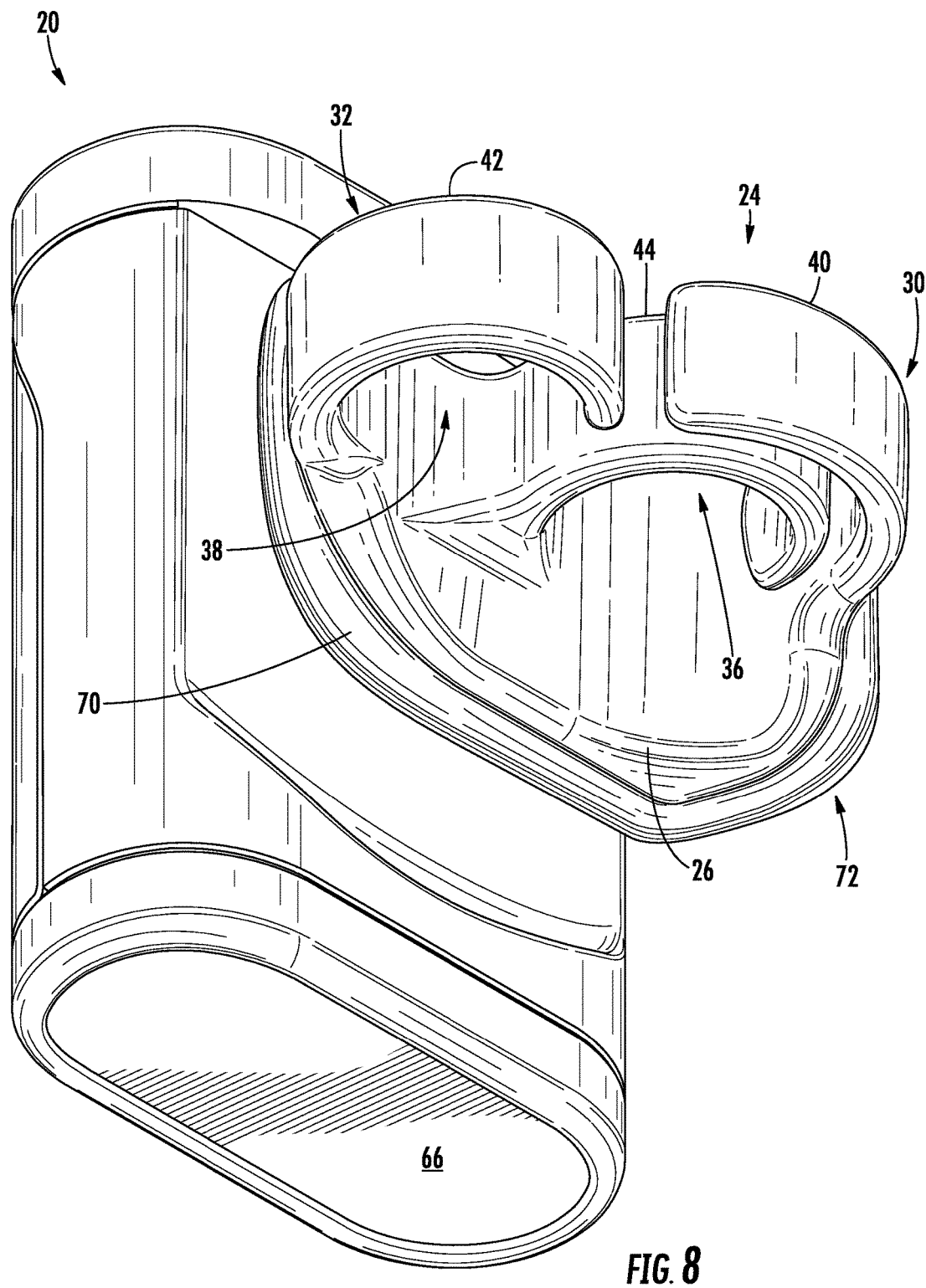
FIG. 8 is a rear, bottom, left pictorial view of the electronic device of FIG. 7.
Figure 9:
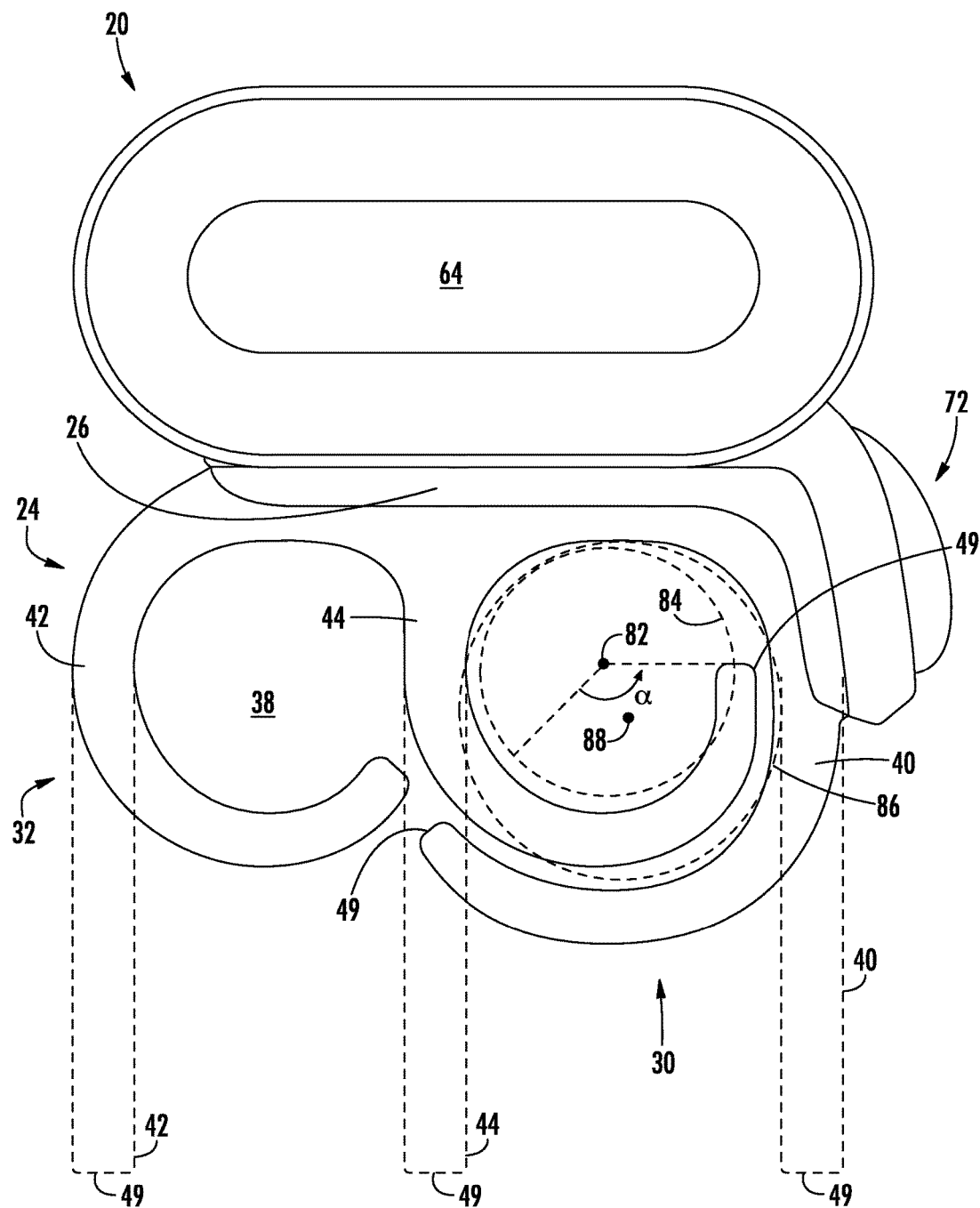
FIG. 9 is a schematic front elevation view of the electronic device of FIG. 7, wherein dashed lines in FIG. 9 schematically depict receptacles in a relatively widely open configuration.

FIGS. 7-9 depict the hand-held electronic device 20 of the second embodiment, which is discussed in the following. In the second embodiment, the third lower portion or extension 44 of the attachment apparatus 24 can be in the form of an arcuate, inner partial band 44. The right partial band 40 can extend partially around the inner partial band 44 so that the right and inner partial bands may cooperatively at least partially define the right receptacle 30. Accordingly, the right partial band 40 can be referred to as an outer partial band 40. The inner extension member, protrusion or partial band 44 can at least partially separate, or substantially separate, the inner areas 36, 38 from one another.

FIGS. 7 and 8 depict, and solid lines in FIG. 9 depict, the attachment apparatus 24 of the second embodiment in a substantially closed configuration. Dashed lines in FIG. 9 schematically illustrate what is believed to be a possible, schematic, non-limiting example of the receptacles 30, 32 in a relatively widely open configuration.

At least partially reiterating from above, in substantially closed configurations of the second embodiment, the receptacles 30, 32 can define expandable, substantially cylindrical shapes (e.g., inner areas 36, 38) that each have an inner diameter that can range from about 15.5 mm to about 28 mm, which approximately corresponds to U.S. ring sizes ranging from about 5 to about 20. When the extension members or partial bands 40, 42, 44 (e.g., C-bands) are expanded or forced outward to accommodate a larger finger or ring size, the respective surfaces of the partial bands 40, 42, 44 continue to substantially encompass and securely engage the exterior of the portions of the fingers therein, so that the user can hold and securely stabilize the electronic device 20 by way of support structure 26. In contrast, when a force of predetermined magnitude is applied that is sufficient to cause reconfiguration of the attachment apparatus 24 into the relatively widely open configuration, gaps between respective free ends 49 become sufficiently large so that the fingers can freely pass through respective gaps (e.g., widely formed openings to the inner areas 36, 38) and exit the inner areas.

In the substantially closed configuration of the second embodiment shown in FIG. 9, the inner partial band 44 extends from a central area of the support structure 26 to the free end 49 of the inner partial band in an arcuate, counter-clockwise direction so that an arcuate, concave inner surface of the inner partial band extends partially around and at least partially defines the right inner area 36. In the example of FIG. 9, the right partial band 40 extends from the right end of the support structure 26 to the free end 49 of the right partial band in an arcuate, clockwise direction, so that the inner surface of the right partial band extends partially around the inner partial band 44, and an elongate gap, an example of which is shown in FIGS. 7-9, can be defined between the adjacent inner and outer surfaces of the inner and right partial bands.

In the substantially closed configurations of the second embodiment, the right partial band 40 at least partially surrounds the inner partial band 44. Referring to FIG. 9 and for example with respect to a center point 82 of the inner partial band 44, the right partial band 40 peripherally overlaps the inner partial band 44 along an arc defined by an angle α. According to some embodiments, the angle α may be more than about 125 degrees, may be more than about 135 degrees and/or may be more than about 145 degrees, while typically being less than 180 or 360 degrees.

The right partial band 40 and inner partial band 44 define an expandable, substantially cylindrical shape having an inner circumference that can range from about 50 mm to about 88 mm, which approximately corresponds to U.S. ring sizes ranging from 5 to 20. Referring to FIG. 9, the center point 82 may represent or be associated with a minimum radius ring 84 for a relatively small finger or minimum ring size (e.g., a ring size of 5, which has an inner circumference of about 49.32 mm).

When the right partial band 40 and inner partial band 44 are expanded or forced outward to accommodate a larger finger or ring size, the partial bands 40, 44 may be positioned such that the free end 49 of the inner partial band 44 is more closely proximate to, substantially aligned with and/or adjacent the free end 49 of the right partial band 40. In one possible example of this configuration, the partial bands 40, 44 may have no radially overlapping sections with respect to one another.

Referring to FIG. 9, at a maximum ring size (e.g., a ring size of 20, which has an inner circumference of about 88.2 mm), the partial bands 40, 44 may be expanded to a maximum ring size 86 for accommodating a relatively large finger. The maximum ring size may be defined by a center point 88 when the partial bands 40, 44 are expanded to the size of the maximum radius ring 86.

A gap formed between the free ends 49 of the partial bands 40, 44 can be formed and farther expanded to provide the relatively widely open configuration of the right receptacle 30 and, thus, allow the user to remove the attachment apparatus 24 in a breakaway fashion. This breakaway feature typically includes pulling the user's finger in a radial direction to create or widen a gap between the free ends 49 of the partial bands 40, 44 that is large enough for the respective finger to pass through the gap. The attachment apparatus 24 is configured to provide adequate attachment force to the user's fingers at the maximum radius ring 86 and yet allows a sufficient gap to be created between the free ends 49 of the partial bands 40, 44 to enable the attachment apparatus 24 to break away, if needed, when a predetermined force is applied in a radially outward direction.

When the attachment apparatus 24 is in the normal, relaxed (e.g., non-strained), substantially closed configuration, the right partial band 40 has an inner radius that can be greater than an outer radius of the inner partial band 44.

Figure 10:
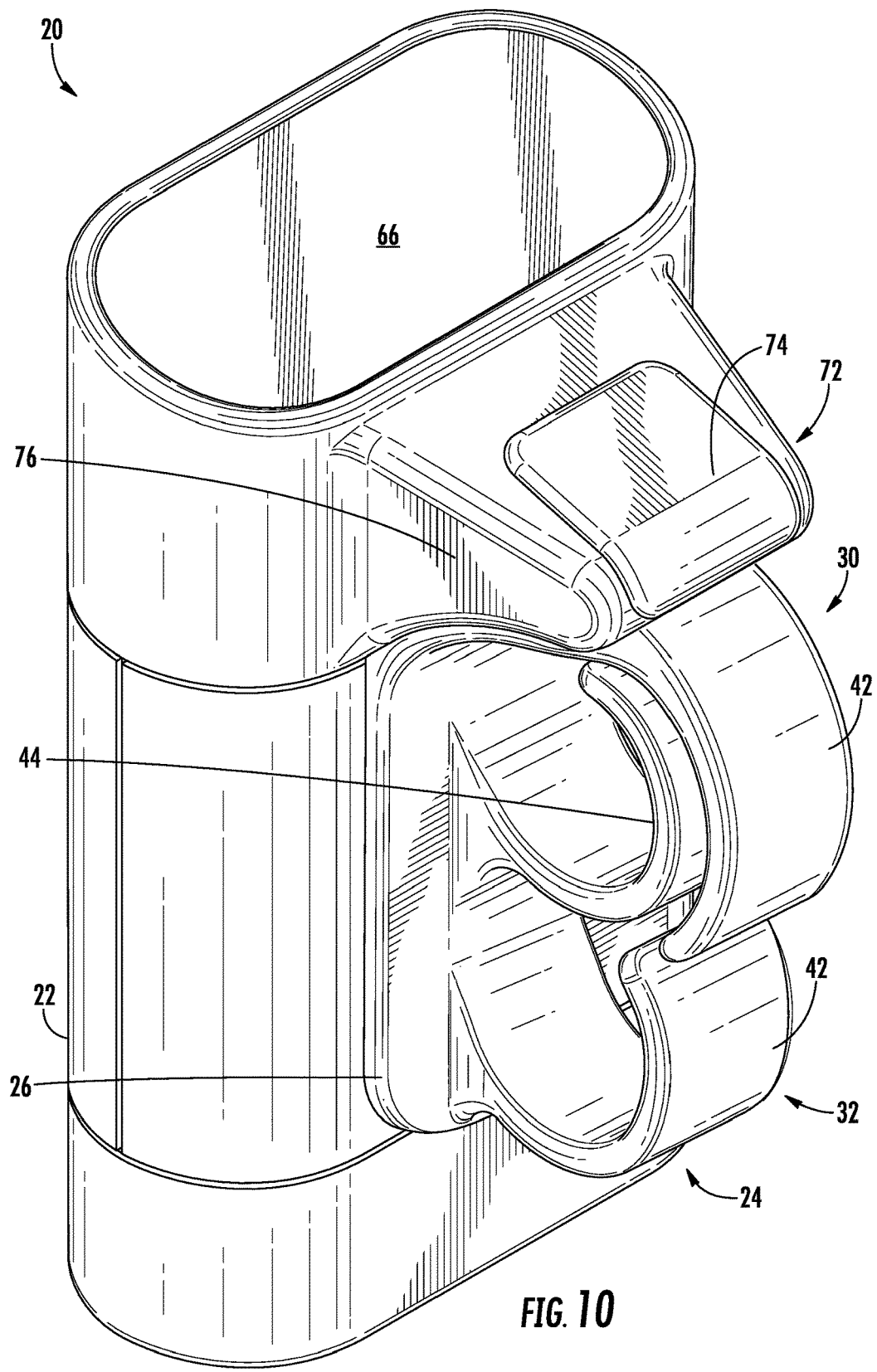
FIG. 10 is a rear, bottom, right pictorial view of an electronic device, wherein the electronic device includes an attachment apparatus, in accordance with a third embodiment of this disclosure.
Figure 11:
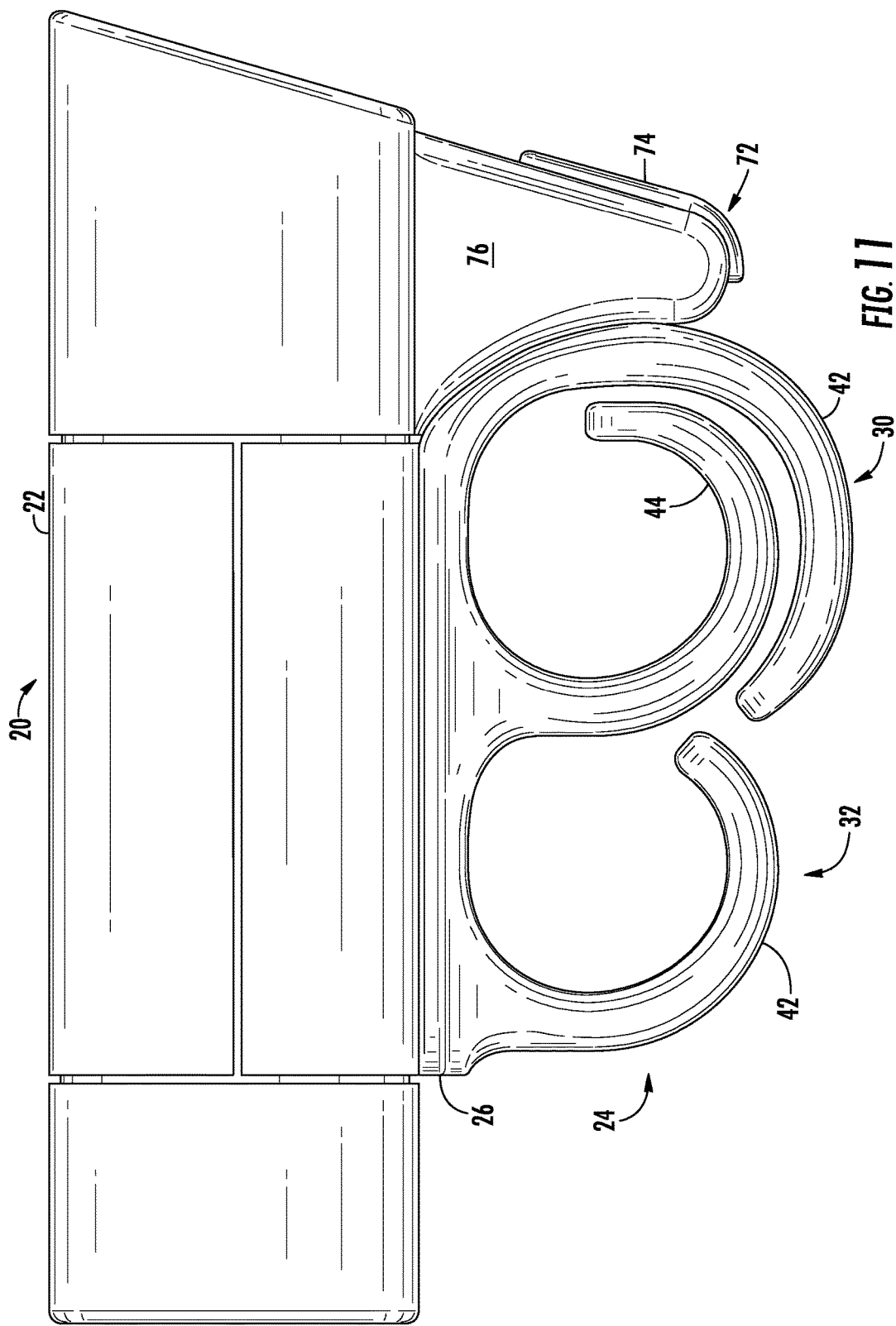
FIG. 11 is a schematic right elevation view of the electronic device of FIG. 10.

FIGS. 10 and 11 depict the hand-held electronic device 20 of the third embodiment, which is discussed in the following. The receptacles 30, 32 and partial bands 40, 42, 44 (e.g., extension members, C-bands, or the like) of the third embodiment can be configured and function like the receptacles 30, 32 and partial bands 40, 42, 44 of the second embodiment. In FIGS. 10 and 11, the support structure 26 of the attachment apparatus 24 is shown as being connected or mounted directly to the lower surface of the base or wall of the housing 22. For example, a mounting platform like the mounting platform 70 of the first and second embodiments can be omitted. Accordingly, in the third embodiment the button housing 76 portion of the switch mechanism 72 can be a protruding portion of the housing 22, or the like.

Figure 12:
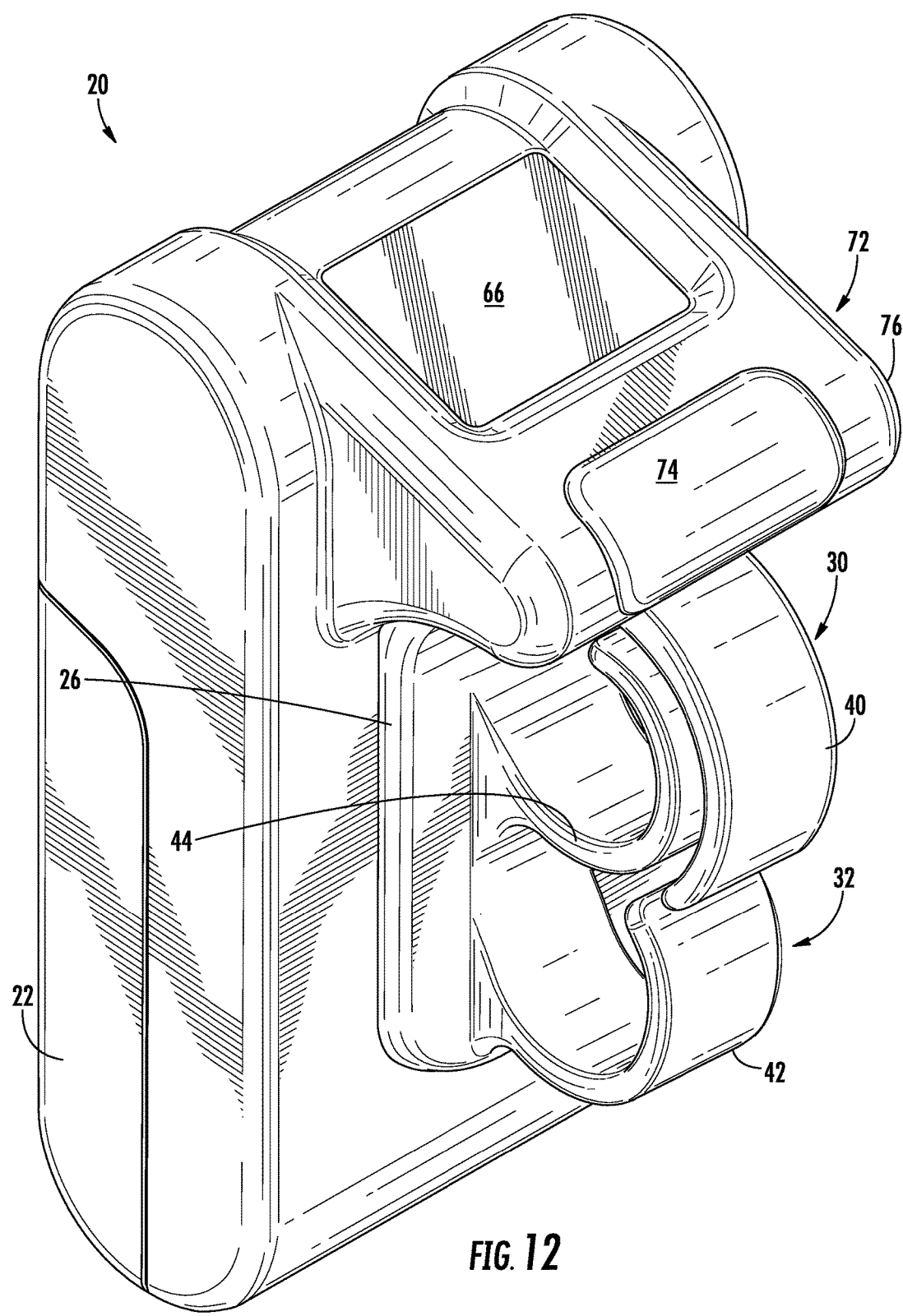
FIG. 12 is a rear, top, right pictorial view of an electronic device, wherein the electronic device includes an attachment apparatus, in accordance with a fourth embodiment of this disclosure.
Figure 13:
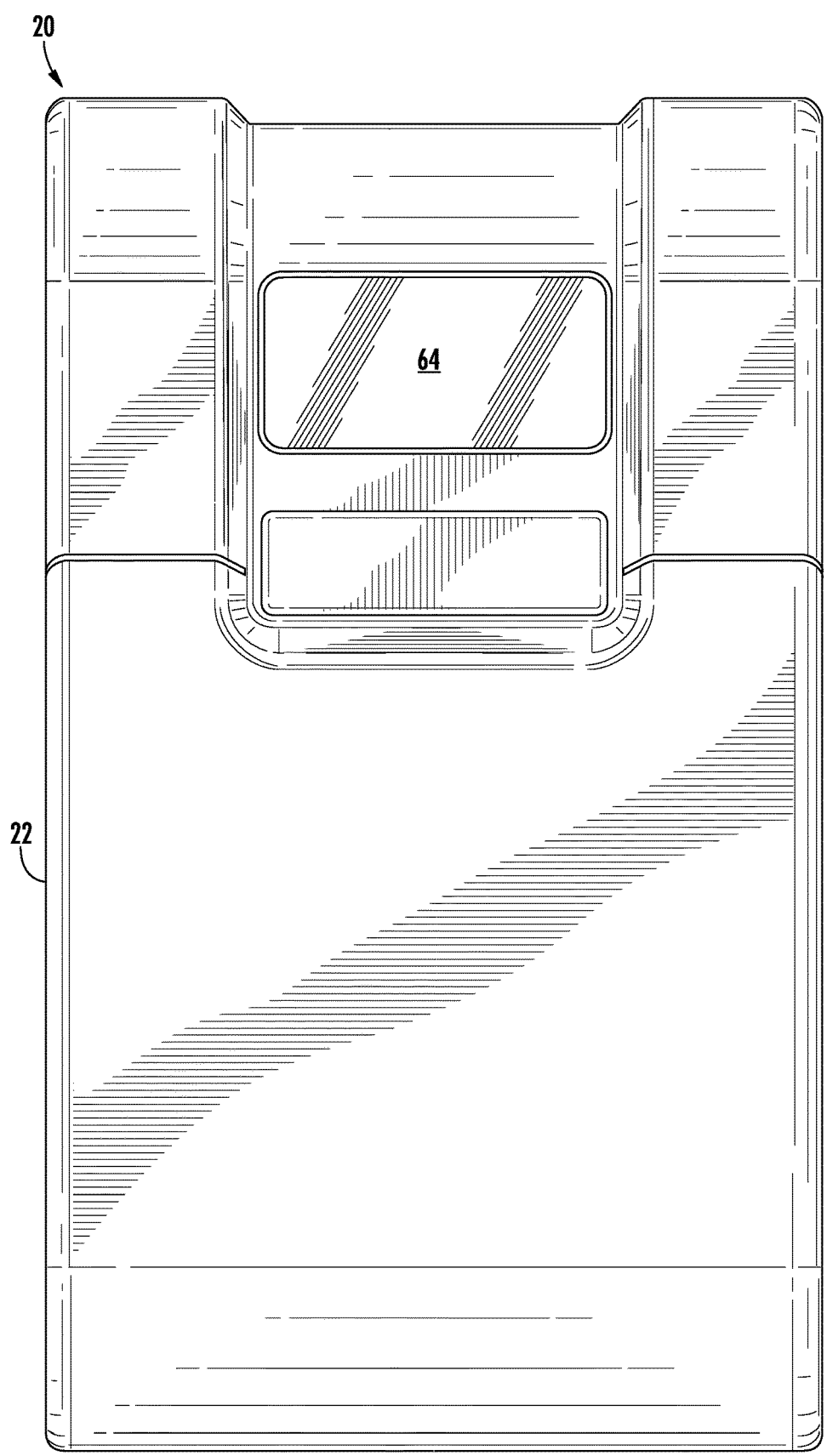
FIG. 13 is a front elevation view of the electronic device of FIG. 12.

FIGS. 12 and 13 depict the hand-held electronic device 20 of the fourth embodiment, which is discussed in the following. The fourth embodiment can be like the third embodiment except, for example, the housing 22 is shaped differently, the display 66 can be relocated to/mounted to the button housing 76, and the mounting location of the window 64 can also vary.

Other embodiments are within the scope of this disclosure. For example, the electronic devices 20 can be configured so that the switch mechanisms 72 are in different locations and/or the electronic devices 20 can include two (or more) oppositely positioned switch mechanisms 72 so that the electronic devices 20 can have right-handed and/or left-hand configurations.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;

U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2016/0227912;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;

U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;

U.S. patent application Ser. No. 13/367,978 for a Laser Scanning Module Employing an Elastomeric U-Hinge Based Laser Scanning Assembly, filed Feb. 7, 2012 (Feng et al.);

U.S. patent application Ser. No. 29/458,405 for an Electronic Device, filed Jun. 19, 2013 (Fitch et al.);

U.S. patent application Ser. No. 29/459,620 for an Electronic Device Enclosure, filed Jul. 2, 2013 (London et al.);

U.S. patent application Ser. No. 29/468,118 for an Electronic Device Case, filed Sep. 26, 2013 (Oberpriller et al.);

U.S. patent application Ser. No. 14/150,393 for Indicia-reader Having Unitary Construction Scanner, filed Jan. 8, 2014 (Colavito et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, examples of embodiments have been disclosed. The present invention is not limited to such exemplary embodiments. Unless otherwise noted, specific terms have been used in a generic and descriptive sense and not for purposes of limitation. The use of the term "and/or" includes any and all combinations of one or more of the associated listed items.

The invention claimed is:

1. An attachment apparatus for attaching an electronic device to at least one digit of a user, the attachment apparatus comprising:
    a support structure comprising an intermediate rib extending along the length of the support structure;
    a first receptacle and a second receptacle, that are each configured to receive at least a portion of a respective digit of a user, wherein adjacent portion of outer surfaces of the first receptacle and the second receptacle engage against each other with free ends of the first receptacle and the second receptacle being spaced apart with gaps from the intermediate rib, and
    wherein the first and second receptacles are configured to:
        at least partially receive the respective digit via relative movement between the first and the second receptacles and the respective digit in a first direction, and
        elastically deform, in response to relative movement between the first and the second receptacles and the respective digit in a second direction that is crosswise to the first direction, to at least further open both of the first receptacle and the second receptacle and widen a gap defined between the first receptacle and the second receptacle, to allow the respective digits to exit the first receptacle and the second receptacle through the gap.

2. The attachment apparatus according to claim 1, wherein:
    the first receptacle is positioned between a switch mechanism and the second receptacle.

3. The attachment apparatus according to claim 1, comprises:
    a support structure with an upper surface, wherein the support structure is configured to support at least a portion of the electronic device; and
    the first and second receptacles are each connected to the support structure.

4. The attachment apparatus according to claim 3, wherein:
    the first receptacle is positioned between the switch mechanism and the second receptacle.

5. The attachment apparatus according to claim 3, wherein:
    the support structure comprises a first side and a second side that are opposite each other;
    the first side is configured to have at least a portion of the electronic device positioned adjacent the first side of the support structure; and
    the first and second receptacles are positioned adjacent the second side of the support structure.

6. The attachment apparatus according to claim 5, wherein:
    the first receptacle is positioned between the switch mechanism and the second receptacle.

7. The attachment apparatus according to claim 5, wherein the first and second receptacles comprise extension members, and proximal portions of the extension members extend away from the second side of the support structure.

8. The attachment apparatus according to claim 5, wherein:

at least a portion of an electronic device is connected to the first side of the support structure; and the first receptacle is positioned between the switch mechanism and the second receptacle.

9. The attachment apparatus according to claim 5, wherein:

the first receptacle comprises a first partial band connected to the support structure and extending partially around a first area configured to receive the respective digit, and the second receptacle comprises a second partial band connected to the support structure and extending partially around an area configured to receive the respective digit.

10. The attachment apparatus according to claim 9, wherein the first and second areas are adjacent to one another and open to one another.

11. The attachment apparatus according to claim 9, wherein the intermediate rib comprises a protrusion at least partially separating the first and second areas from one another.

12. The attachment apparatus according to claim 11, wherein:

the protrusion is a third partial band connected to the support structure, and the first partial band extends partially around the third partial band.

13. An attachment apparatus for attaching an electronic device to at least one digit of a user, the attachment apparatus comprising:

a support structure comprising an intermediate rib extending along the length of the support structure;

a first partial band extending from the support structure at least partially around a first inner area configured to at least partially receive at least a first digit of a user; and a second partial band extending from the support structure at least partially around a second inner area configured to at least partially receive at least a second digit of the user, wherein the first and second partial bands extend convergently toward one another so that a free end of the first partial band is adjacent a free end of the second partial band, wherein adjacent portion of outer surfaces of the first partial band and second partial band engage against each other with the free ends of the first partial band and second partial band being spaced apart with gaps from the intermediate rib, wherein each of the first and second inner areas is configured to at least partially receive the respective digit via relative movement between the respective inner area and the respective digit in a first direction, and wherein each of the first and second partial bands is configured to elastically deform, in response to relative movement between the respective inner area and the respective digit in a second direction that is crosswise to the first direction, to at least increase a distance between the free end of the first partial band and the free end of the second partial band, and allow the first and second digits to simultaneously exit the first and second inner areas by simultaneously passing outwardly between the free end of the first partial band and the free end of the second partial band.

14. The attachment apparatus according to claim 13, wherein the first and second areas are adjacent to one another and open to one another.

15. The attachment apparatus according to claim 13, wherein the intermediate rib comprises a protrusion at least partially separating the first and second areas from one another.

16. The attachment apparatus according to claim 15, wherein:

the protrusion is a third partial band connected to the support structure, and the first partial band extends partially around the third partial band.

17. The attachment apparatus according to claim 16, wherein the third partial band is configured to elastically deform, in response to relative movement between the first receptacle and the first digit in the second direction that is crosswise to the first direction, to at least increase a distance between the free end of the first partial and a free end of the third partial band, and allow the first digit to exit the first receptacle by passing outwardly between the free end of the first partial and the free end of the third partial band.

18. The attachment apparatus according to claim 16, wherein the third partial band separates the first and second inner areas from one another.

* * * * *